Oct. 14, 1969  J. G. KUHN  3,472,574

WAVE DEFLECTOR ARRANGEMENT

Filed Aug. 1, 1966  2 Sheets-Sheet 1

INVENTOR.
JACKSON G. KUHN,
BY
ATTORNEY.

Oct. 14, 1969    J. G. KUHN    3,472,574
WAVE DEFLECTOR ARRANGEMENT
Filed Aug. 1, 1966    2 Sheets-Sheet

United States Patent Office 3,472,574
Patented Oct. 14, 1969

3,472,574
WAVE DEFLECTOR ARRANGEMENT
Jackson G. Kuhn, Santa Barbara, Calif., assignor to Santa Barbara Research Center, Goleta, Calif., a corporation of California
Filed Aug. 1, 1966, Ser. No. 569,499
Int. Cl. G02b *17/06*
U.S. Cl. 350—7                                 3 Claims

ABSTRACT OF THE DISCLOSURE

The invention discloses a wave deflector arrangement comprising a plurality of identically configured wave transparent blocks arranged in sandwiched relationship to provide a thin planar structure as seen in transverse sectional view. Certain surfaces of each block may be coated with a reflective material and also may be provided with a second coat of light absorbing material. The light receiving and light exiting edges of each block have a length dimension in determined relation to the length dimension of the abutting surfaces so that entering waves are refracted and reflected throughout each strip and exit in an identical but reverse location from the point of wave entry. An alternate embodiment shows the blocks in slightly spaced relation.

---

The invention relates to a wave deflector arrangement that has particular utility in certain mechanisms such as hemispheric scanners.

Prior art optical systems have used simple mirror systems to change direction of propagated visible light waves. Similarly, mirrored systems have been used in the ultraviolet and infrared spectral regions to accomplish direction change of propagated waves. Other and more complex devices, such as prism systems, have been used to accomplish this end as will be familiar to those active in the optical field.

In many service applications, such as the herein disclosed hemispherical scanner, mirror or prism systems have proven to be unsatisfactory in that they require considerable space and add a great deal of weight to the structure which is undesirable in many applications. For example, both weight and space are at a premium in orbiting satellites. Further, certain of these systems are not truly achromatic; that is, in refracting the light beam it is partially broken down or dispersed into constituent colors. To avoid distortion, expense is involved to provide optically true mirror and prism systems. Efficiency sometimes suffers due to the relatively long path through which the beam passes in the prisms.

While, herein, reference usually will be made to light waves, that is, electromagnetic waves in the visible spectrum, it will be understood that the disclosed invention may also be applied in the ultraviolet and infrared spectral regions.

It is a primary object of the present invention to provide a beam deflector arrangement, simple in construction, utilizing little space in most service applications, relatively light in weight, and economical when compared to prior art structures.

It is a further object of the invention to provide a beam deflector arrangement which is highly efficient, that is, transmits a major portion of the light energy received.

It is a further object of the invention to provide a deflector arrangement that is remarkably free from distortion as compared to economical prior art arrangements.

It is yet a further object of the invention to provide a beam deflector arrangement that is completely achromatic over the full spectral band that it is designed to transmit.

These and other objects and advantages of the invention will become apparent in the course of the following description and from an examination of the related drawings wherein.

As noted above, the invention may be employed within various electromagnetic wavelengths of the spectral band such as ultraviolet, infrared, and visual. It is necessary, however, to use structure which is transparent to transmitted waves in the particular wavelength region of the designed application. For example, the structure described below may employ quartz or glass material when it is to be utilized to deflect waves in the visible region. Alternately, if it is desired to transmit and deflect waves in the infrared region, germanium or silicon would be appropriate in that they are transparent to infrared beam propagation. Other materials may also be used in these or other particular applications as will be well known to those familiar to this field.

Figure 1:
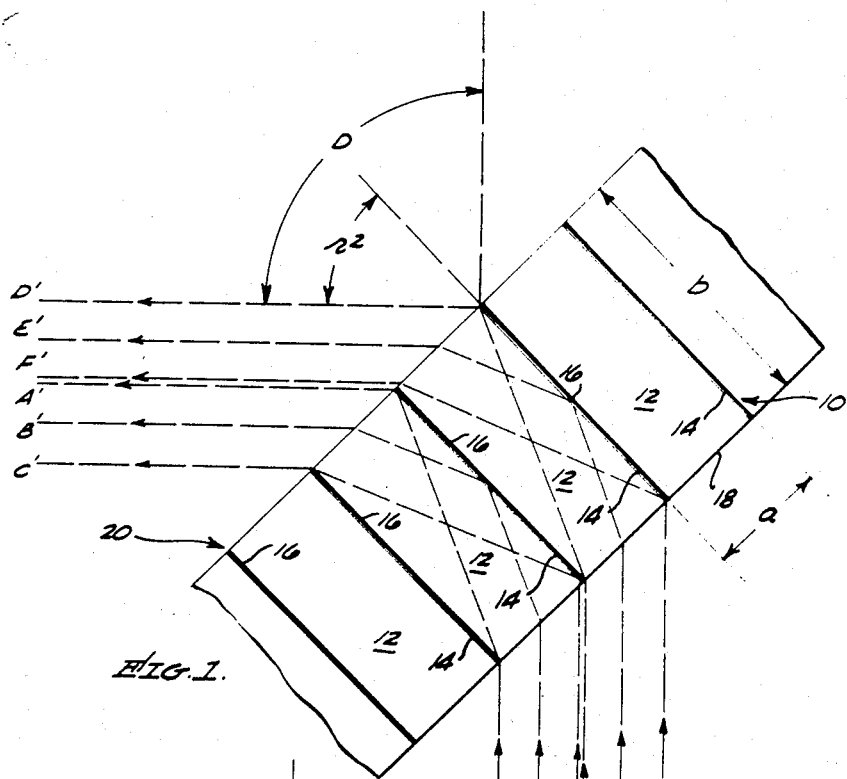
FIGURE 1 is a fragmentary, side-elevational view of a preferred embodiment of the invention and illustrating the deflection mode.

The selected structure is indicated generally at 10 in FIG. 1 and comprises a plurality of narrow elongated strips 12, 12 of appropriate material such as glass or quartz where deflection of visible light waves is to be accomplished. In a preferred embodiment elongated strips 12 are provided with internal reflection surfaces 14, 14. Reflective surfaces may be provided by aluminize coating the surface of each strip 12. Over the reflecting aluminized material a thin surface of black material 16, 16 is provided to create a blackbody surface and accommodate the absorption of scattered light waves which would tend to reduce the efficiency of the deflection arrangement. Thereafter, the plurality of strips 12 are placed in juxtaposition to each other so that the various strips 12 surface abut each other and are disposed within the same plane. A unitary plane is thus provided having a plurality of separate light-transmitting segments therein.

If desired, an appropriate mastic may be used to band the strips 12 or they may be physically connected by mounting in an appropriate supporting and clamping arrangement.

Figure 2:
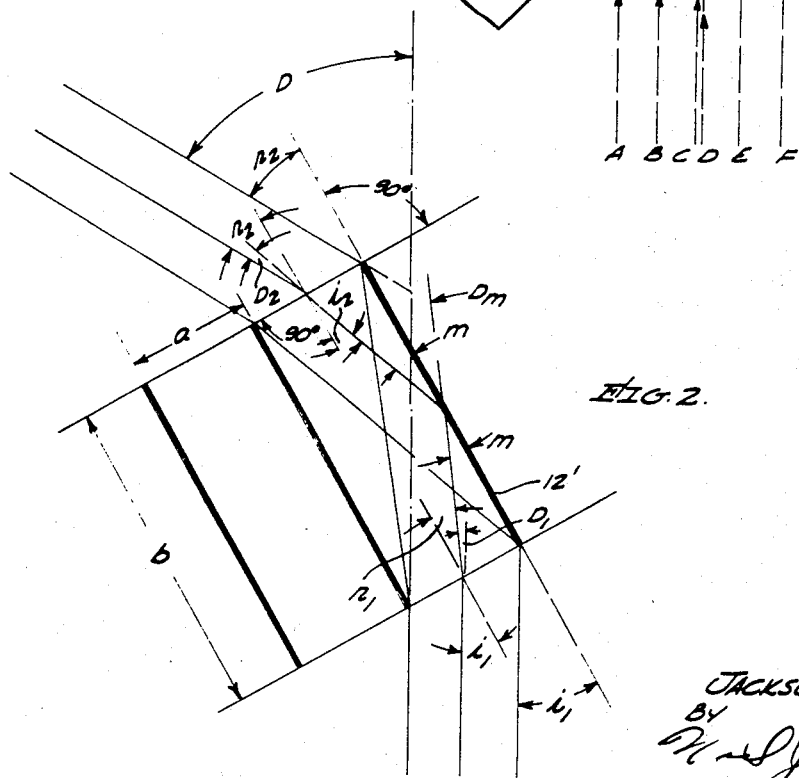
FIG. 2 is an end-elevational view of the invention utilized to explain structure design parameters to provide the desired objects.
Figure 2A:
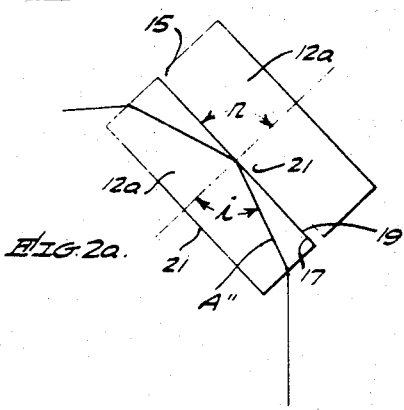
FIG. 2a is a partially schematic view illustrating a modification of the invention.

As an alternate embodiment the arrangement shown in FIG. 2a may be employed. As illustrated, the strips 12a, 12a are parallel positioned so that a small space 15 exists therebetween. The space 15 should be dimensioned so that it is greater than a wavelength of the beam being transmitted. If the angle $i$ is greater than the critical angle for the material used in the strip 12a, then the refracted beam A″ will reflect from surface 17 without the necessity of having aluminizing reflective material covering surface 19 of the strip 12a. The critical angle $i$ is that angle where the refracted angle $r$ equals 90°. If the angle $i$ of beam A″ were less than the critical angle the beam would pass from surface 19 into space 15 and be lost. If this mode of obtaining the desired light beam transmission is used it would be desirable to coat surface 21 of each strip 12a with a light absorbent material, e.g., a blackening agent to trap scattered light.

To illustrate the operation and the light-deflecting capacity of the arrangement, a collimated light beam comprising elements A, B, C, D, E, and F are shown as arrows striking a common surface 18 on one side of the composite plate 10. Element beam A strikes the surface 12 and is refracted as shown through the strip 12 and is reflected from surface 14 immediately adjacent the opposed surface 20 to the composite arrangement 10. The exiting beam is shown at A′. Light beam B strikes the surface 18 of block 12, is refracted upon passing through that surface and reflected from surface 14 to the surface 20 where it is again refracted upon exit from said surface 20 as is shown at B′. Entrance refraction, reflection and exit refraction similarly occurs in re light beams C, D, E and F and exit is shown at C′, D′, E′, and F′, respectively. It is noted, however, that the beam has not only been deflected but has been reversed as a result of transmission through the arrangement 10. It is again noted that the strips 12 may be formed of various materials, it only being necessary that they be transparent to the wavelength of the beam for which they are designed to deflect.

To maintain high efficiency beam transmission within this arrangement, it is necessary that the ratio of segment trickness $a$ to segment width $b$ be such that there be a dimensional identity between the point of entry of a particular beam segment at surface 18 and the point of exit of that same beam from the surface 20. This requires that each segment 12 be appropriately sized depending upon the index of refraction of the particular material used.

Directing attention to FIG. 2, it will be seen that a layout is provided which teaches a mode of obtaining the proper ratio, assuming, for example, a silicon strip 12 having a refractive index of 1.76 and a desired deflection angle D of 60°.

Referring to FIG. 2, the index of refraction $n$, according to Snell's law, is:

$$n = \sin i_1 / \sin r_1 \quad (1)$$

By definition $\tan r_1 = a/b$ and $\quad (2)$ $$D_1 = i_1 - r_1$$
$$D_m = 2m$$
$$D_2 = r_2 - i_2$$

Total deflection $D = D_1 + D_m + D_2$ where $$i_1 = r_2$$
$$r_1 = i_2$$
$$D = i_1 - r_1 + 2m + r_2 - i_2 = 2(i_1 - r_1 + m)$$

also $$m = r_1 \text{ or } -r_1 + m = 0$$

then $$D = 2i$$

where $D = 60°$ $$i_1 = D/2$$
$$i_1 = 30°$$

From Eq. 1 $\sin r_1 = 1/n \sin i$, then (1) and (3)

$$\sin r_1 = 1/1.76 \times .5 = .2841$$

then $$r_1 = 16.5°$$

from (2)

$$\tan r_1 = a/b = \tan 16.5° = .2962$$

Therefore segments 12 must be dimensioned so that ratio $a/b = .2962$ for maximum efficient beam transmission. That is to say with this ratio of $a/b$ and assuming rectangular strips 12 as seen in cross-section, a discrete segment of beam entering surface 18, will exit at substantially the same location on the surface 20. In other words, there will exist a substantial identity of reversed location between the point of beam entry on one surface and point of beam exit on the other surface when the respective surfaces are substantially congruent.

Figure 3:
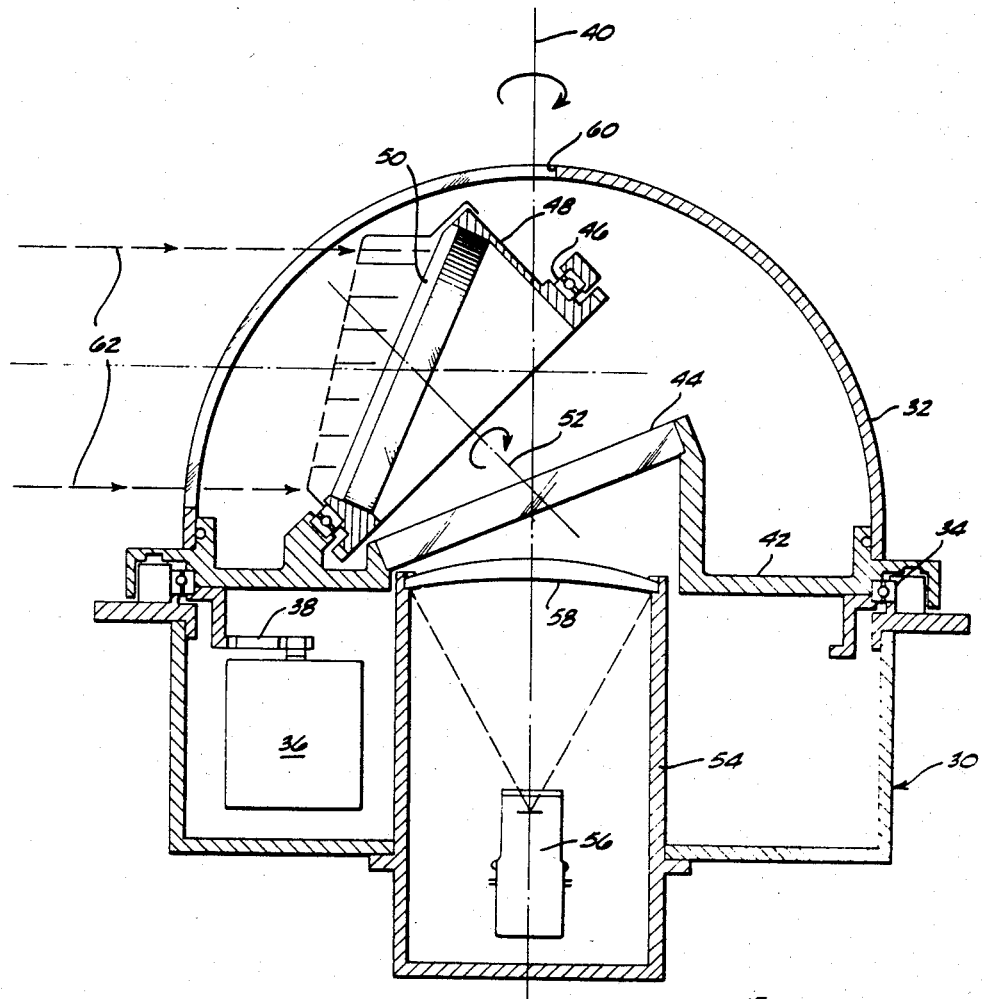
FIG. 3 is a central, vertical, sectional view partially in elevation, illustrating the invention as applied to a hemispherical scanner.

Directing attention to FIG. 3 which is a vertical, sectional view of a hemispherical scanner to which the disclosed invention may be applied. The numeral 30 generally indicates a housing which may be carried in an appropriate vehicle, such as an aircraft, and affixed thereto. A dome 32 is carried by the housing 30 via bearings 34 and a suitable drive such as a power source or motor 36 is provided. A driving gear train 38 interconnects the motor 36 and the dome 32 and induces rotation of the dome and connected structure about the vertical axis 40. Internally, the dome 32 carries a support plate 42, the latter supporting, centrally thereof, a deflector structure 44 identical to that described with reference to FIG. 1. The plate 42 additionally carries mounted bearings 46, the latter rotatably carrying support structure 48 having connected thereto a second deflector arrangement 50, again, identical with that described with reference to FIG. 1. Driving structure (not shown) is provided to rotate the deflector arrangement 50 about axis 52, said axis being inclined 45° to axis 40.

The housing 30 was provided with a central telescope section 54, the latter housing a detector structure 56 which may be any conventional energy-sensitive device such as an infrared detector. A lens 58 is provided to focus the incoming waves on the detector 56.

In operation, the power source 36 rotates the dome 32 about the axis 40 and concurrently the deflector arrangement 50 is rotated about the axis 52. Thus, an entire hemisphere is continuously scanned via an opening 60 in the dome 32. The received beam is indicated by line 62, 62, and is initially deflected by the arrangement 50 forty-five degrees so that the beam falls uniformly on deflector arrangement 44, the latter deflecting the beam 45° for impingment of the beam upon lens 58 which in turn focuses the beam on detector 56 as shown by lines 64, 64. Note particularly that the propagated or received wave always strikes the plane surface of each deflector arrangement in acute angular relation thereto. In this manner all points in a given hemisphere would be scanned in a suitable unit of time depending upon speed of rotation and effective area of the detector.

To summarize, the disclosed invention provides an economical novel mode of beam deflection as compared to prior art mirror and prism systems and has attendant advantages of reduced size, weight and installation space. It is fully achromatic over the full design band of wave energy, whereas prior art prism systems could only be achromatically designed at great expense. Additionally, it avoids elliptical distortion that was inherent in some prior art prism systems.

The invention as shown is by way of illustration and not limitation and may be modified in various particulars all within the spirit thereof.

What is claimed is:
1. In a scanning mechanism,
   a first generally planar wave deflector in acute angular relation to the direction of propagation of the wave being scanned,
   a second generally planar wave deflector, the plane of which is in acute angular relation to the plane of the first deflector,
   means to move the deflectors through a scanning area,
   a focusing point having image sensor there located,
   optical means in optical series with the deflectors to convey and focus the deflected wave at the point,
   said first deflector being operative to deflect the received wave in a first direction which defines an acute angle with the original direction of wave propagation and said second deflector being operative to further deflect along the axis of said optical means, said axis being in acute angular relation to said first direction, each of said wave deflectors comprising a plurality of identically configured wave transparent strips, said strips being positioned in surface adjacency with opposed edges thereof falling within common planes, said edges being substantially congruently configured, one of said edges being operative to receive said propagated wave and refract same internally of the strips, the other of said edges being operative to refract the exiting wave, and reflective means internally of the deflector strips operative to reflect the wave transmitted therewith, the length dimension of the edges and the surfaces as seen in transverse sectional view being proportioned so that there is an identity of reversed location of wave entry and exit from the respective edges of each of said deflectors.

2. A scanning mechanism according to claim 1, wherein the adjacent surfaces of each of said strips are spaced from each other a distance greater than the wave length of the deflected wave.

3. A scanning mechanism according to claim 1, wherein the adjacent surfaces of each of said strips are in abutting engagement.

References Cited

UNITED STATES PATENTS

| | | | |
|---|---|---|---|
| 2,140,584 | 12/1938 | Jeffree | 178—7.6 |
| 622,506 | 3/1899 | Manning | 350—262 X |
| 2,154,686 | 4/1939 | Logan | 350—262 X |
| 2,457,543 | 12/1948 | Goldsmith et al. | 350—24 |
| 2,597,001 | 5/1952 | Jaffe. | |
| 3,023,662 | 3/1962 | Hicks | 350—7 |
| 3,193,682 | 7/1965 | Weiss | 350—7 X |
| 3,204,523 | 9/1965 | Daily | 350—26 X |
| 2,928,952 | 3/1960 | Bednarz | 350—7 X |

DAVID SCHONBERG, Primary Examiner

PAUL R. GILLIAM, Assistant Examiner

U.S. Cl. X.R.

350—203, 262, 287